(12) United States Patent
Holmquist et al.

(10) Patent No.: US 6,957,124 B2
(45) Date of Patent: Oct. 18, 2005

(54) SYSTEM AND METHOD FOR PROVIDING POWER AND CONTROL SIGNALS TO AN ELEMENT RETRIEVAL DEVICE

(75) Inventors: Thomas W. Holmquist, Fort Collins, CO (US); Joe A. Eccher, Henderson, NV (US); Curtis C. Ballard, Eaton, CO (US); Richard Irwin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/421,520

(22) Filed: Apr. 23, 2003

(65) Prior Publication Data
US 2004/0215366 A1 Oct. 28, 2004

(51) Int. Cl.⁷ .................................................. G06F 7/00
(52) U.S. Cl. .................. 700/214; 700/213; 414/279; 340/310.03
(58) Field of Search ................................ 700/214, 213, 700/228; 340/310.01, 310.03, 310.06; 104/88.02, 88.03, 287; 414/279, 289, 935–941

(56) References Cited

U.S. PATENT DOCUMENTS

| | | | |
|---|---|---|---|
| 3,881,053 A | * | 4/1975 | Lemelson .................... 348/107 |
| 5,303,214 A | | 4/1994 | Kulakowski et al. |
| 5,395,199 A | | 3/1995 | Day, III et al. |
| 5,773,939 A | * | 6/1998 | Severson et al. ............. 318/51 |
| 5,886,619 A | * | 3/1999 | Takasan et al. ......... 340/310.06 |
| 6,175,539 B1 | | 1/2001 | Holmquist et al. |
| 6,457,681 B1 | * | 10/2002 | Wolf et al. ............. 246/187 A |
| 6,490,122 B1 | * | 12/2002 | Holmquist et al. ........... 360/92 |
| 6,668,991 B2 | * | 12/2003 | Canaday et al. ................ 191/2 |
| 6,698,359 B1 | * | 3/2004 | Ostwald et al. .......... 104/88.02 |

FOREIGN PATENT DOCUMENTS

| | | |
|---|---|---|
| EP | 0 768 657 | 4/1997 |
| WO | WO 96/18997 | 6/1996 |

* cited by examiner

*Primary Examiner*—Khoi H. Tran (57) ABSTRACT

An element handling system utilizes an element retrieval device and a decoder. The element retrieval device is configured to retrieve and transport a movable element in response to control data. The decoder is coupled to the element retrieval device. The decoder is configured to filter a combined power and control signal to recover an encoded control signal. The decoder is further configured to decode the control signal to recover the control data.

25 Claims, 11 Drawing Sheets

(Side View)

SYSTEM AND METHOD FOR PROVIDING POWER AND CONTROL SIGNALS TO AN ELEMENT RETRIEVAL DEVICE

BACKGROUND OF THE INVENTION

1. Field of the Invention

The present invention generally relates to element handling systems and, in particular, to a system and method for transmitting power and control signals to an element retrieval device.

2. Related Art

Cartridge handling systems transport movable data cartridges stored within a cartridge storage library, to various locations within the cartridge handling system in response to commands received from a host computer. Moreover, when the host computer is to read from and/or write to a data cartridge, the host computer may issue a command for retrieving the data cartridge and loading the data cartridge into a cartridge interface device accessible to the host computer.

For example, a cartridge handling system may employ a cartridge retrieval device that locates and retrieves the requested data cartridge from the cartridge storage library. The cartridge retrieval device normally comprises a "picker" for grabbing the requested data cartridge and removing the data cartridge from the cartridge storage library. After utilizing the picker to retrieve the requested data cartridge, the cartridge retrieval device transports the cartridge to the cartridge interface device and again utilizes the picker to load the cartridge into the cartridge interface device. The host computer then utilizes the cartridge interface device to read from and/or write to the loaded data cartridge. Once the host computer no longer needs access to the data cartridge, the host computer issues a command for returning the data cartridge to the cartridge storage library. In response to such a command, the cartridge retrieval device retrieves the cartridge from the cartridge interface device and transports the cartridge back to the cartridge storage library.

Control signals for instructing a cartridge retrieval device to retrieve and move cartridges, as described above, and/or a power signal for providing the cartridge retrieval device with power are typically transmitted to the cartridge retrieval device via one or more wires coupled to the cartridge retrieval device. As the cartridge retrieval device moves from one location to another and/or handles data cartridges, the foregoing wires can become entangled with the cartridge retrieval device causing the cartridge retrieval device to malfunction. Further, such wires are typically flexed or bent when the cartridge retrieval device moves, thereby causing the wires to fatigue and eventually fail.

In an effort to prevent such problems, the aforementioned power and control wires are sometimes eliminated from the design of the cartridge handling system. The power wires may be eliminated by installing a battery on the cartridge retrieval device or by transmitting a power signal to the cartridge retrieval device over conductive track members that may also be used to guide the cartridge retrieval device. Further the control wires may be eliminated by wirelessly transmitting the control signals to the cartridge retrieval device. For example, U.S. Pat. No. 5,303,214 discloses the use of infrared signals to communicate the control signals to a wireless receiver residing on the cartridge retrieval device. However, as the cartridge retrieval device moves, ensuring that such a wireless receiver is correctly positioned for receiving the wireless control signals may be problematic, particularly for cartridge retrieval devices capable of moving in at least two dimensions.

SUMMARY OF THE INVENTION

Generally, the present invention pertains to systems and and methods for transmitting power and control signals to an element retrieval device.

One embodiment of the present invention is an element handling system comprising an element retrieval device and a decoder. The element retrieval device is configured to retrieve and transport a movable element in response to control data. The decoder is coupled to the element retrieval device. The decoder is configured to filter a combined power and control signal to recover an encoded radio frequency (RF) control signal. The decoder is further configured to decode the RF control signal to recover the control data.

Another embodiment is an element handling system comprising an element retrieval device and a ceramic filter. The element retrieval device is configured to retrieve and transport a movable element in response to control data. The ceramic filter is coupled to the element retrieval device. The ceramic filter is configured to filter a combined power and control signal thereby recovering the control signal that comprises the control data.

A further method in accordance with an exemplary embodiment of the present invention comprises encoding a radio frequency (RF) signal with control data, combining the encoded RF signal with a power signal thereby forming a combined power and control signal, retrieving and transporting a movable element via an element retrieval device in response to the control data, transmitting the combined power and control signal to the element retrieval device, filtering the power and control signal thereby recovering the encoded RF signal, and decoding the recovered encoded RF signal thereby recovering the control data.

A method in accordance with another exemplary embodiment of the present invention comprises transmitting a combined power and control signal to an element retrieval device, and filtering, via a ceramic filter, the combined power and control signal, thereby recovering a control signal, the control signal comprising the control data.

BRIEF DESCRIPTION OF THE DRAWINGS

The invention can be better understood with reference to the following drawings. The components of the drawings are not necessarily to scale relative to each other, emphasis instead being placed upon clearly illustrating the principles of the invention. Furthermore, like reference numerals designate corresponding parts throughout the several views.

DETAILED DESCRIPTION

An element handling system in accordance with an exemplary embodiment of the present invention utilizes an element retrieval device for retrieving and transporting movable elements within the element handling system. The element retrieval device, in such an embodiment, is preferably coupled to at least one track member that is utilized to provide the element retrieval device with a power signal. In order to reliably communicate control data to the element retrieval device, a signal may be encoded with the control data. The encoded signal may then be combined with the power signal before the power signal is transmitted to the element retrieval device. A filter on board the element retrieval device then preferably filters the combined signal in order to recover the encoded signal, and a decoder preferably decodes this signal to recover the control data. The recovered control data may then be used to control the operation of the element retrieval device.

Figure 1:
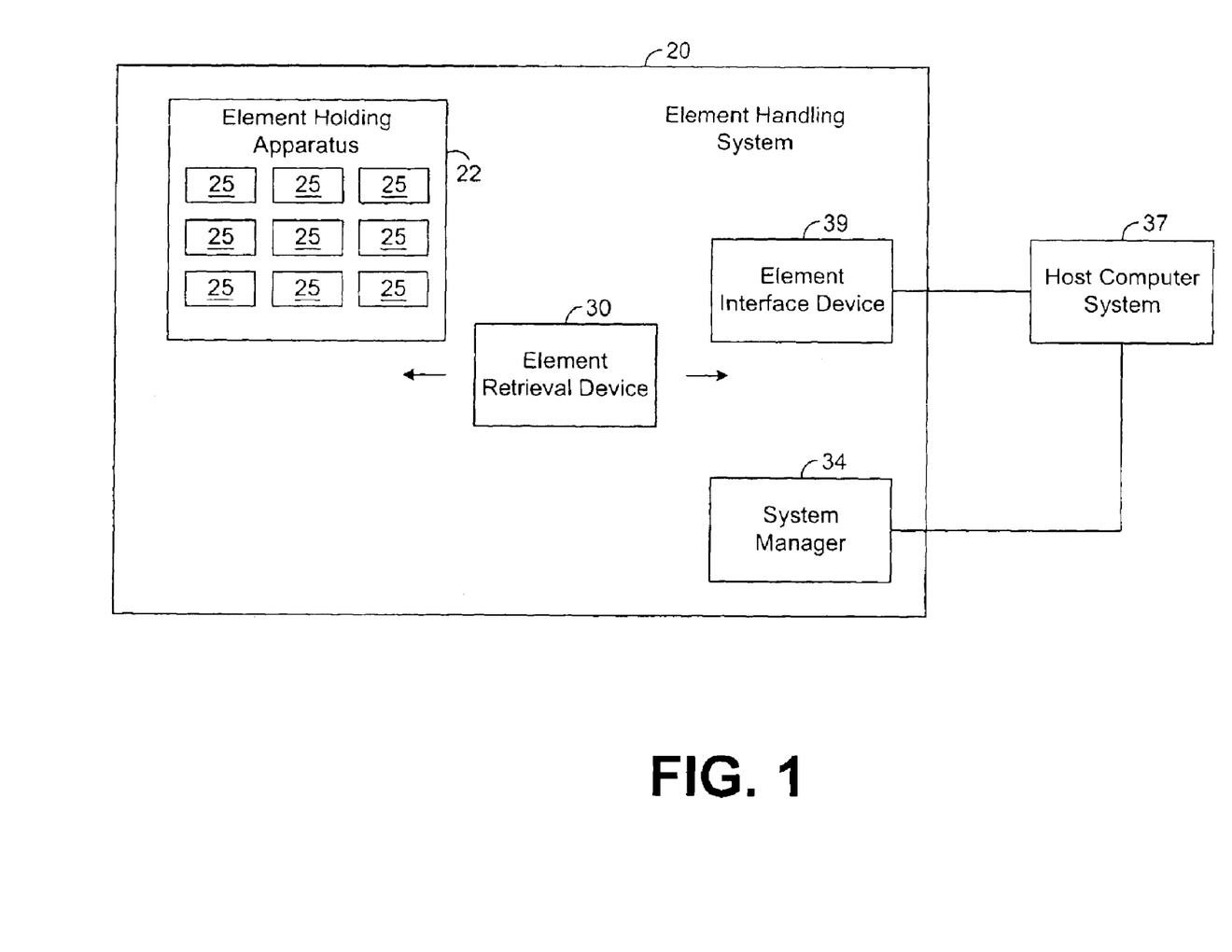
FIG. 1 is a block diagram illustrating an exemplary embodiment of an element handling system in accordance with the present invention.

FIG. 1 depicts a element handling system 20 in accordance with an exemplary embodiment of the present invention. As shown by FIG. 1, the system 20 preferably comprises an element holding apparatus 22 for storing a plurality of movable elements 25. Note that each of the elements 25 may comprise a data element, such as a memory disc, for example. Further, for illustrative purposes, it will be assumed that each of the elements 25 comprises a data cartridge, and the system 20 will be described as a system for handling data cartridges. However, it should be noted that, in other embodiments, each of the elements 25 may comprise other types of devices, and the term "element" should not be construed as being limited to data cartridges only. For example, the element handling system 20 may be employed within a medical research facility, and each element 25 may comprise a vial of a substance that is under research. Thus, in other embodiments, the system 20 may handle and transport various types of elements.

The system 20 of FIG. 1 preferably comprises a movable element retrieval device 30 for retrieving and transporting at least one of the elements 25 according to control signals received from a system manager 34. As an example, the system manager 34 may receive, from a host computer system 37, a command requesting access to one of the elements 25 identified by the command. In response, the system manager 34 may transmit, to the element retrieval device 30, control data instructing the device 30 to retrieve the identified element 25 and to load the identified element 25 into an element interface device 39 that may be utilized by the host computer system 37 for writing to and/or reading from elements 25 loaded into the element interface device 39. Note that the system manager 34 may be implemented in hardware, software, or a combination thereof.

Based on the control data, the element retrieval device 30 moves to a position such that a picker 45 (FIG. 2) may retrieve the identified element 25 from the element holding apparatus 22. The picker 45 may be any known or future-developed device capable of removing elements 25 from and/or loading elements 25 to the element holding apparatus 22 or other element storage component (e.g., element interface device 39).

Figure 2:
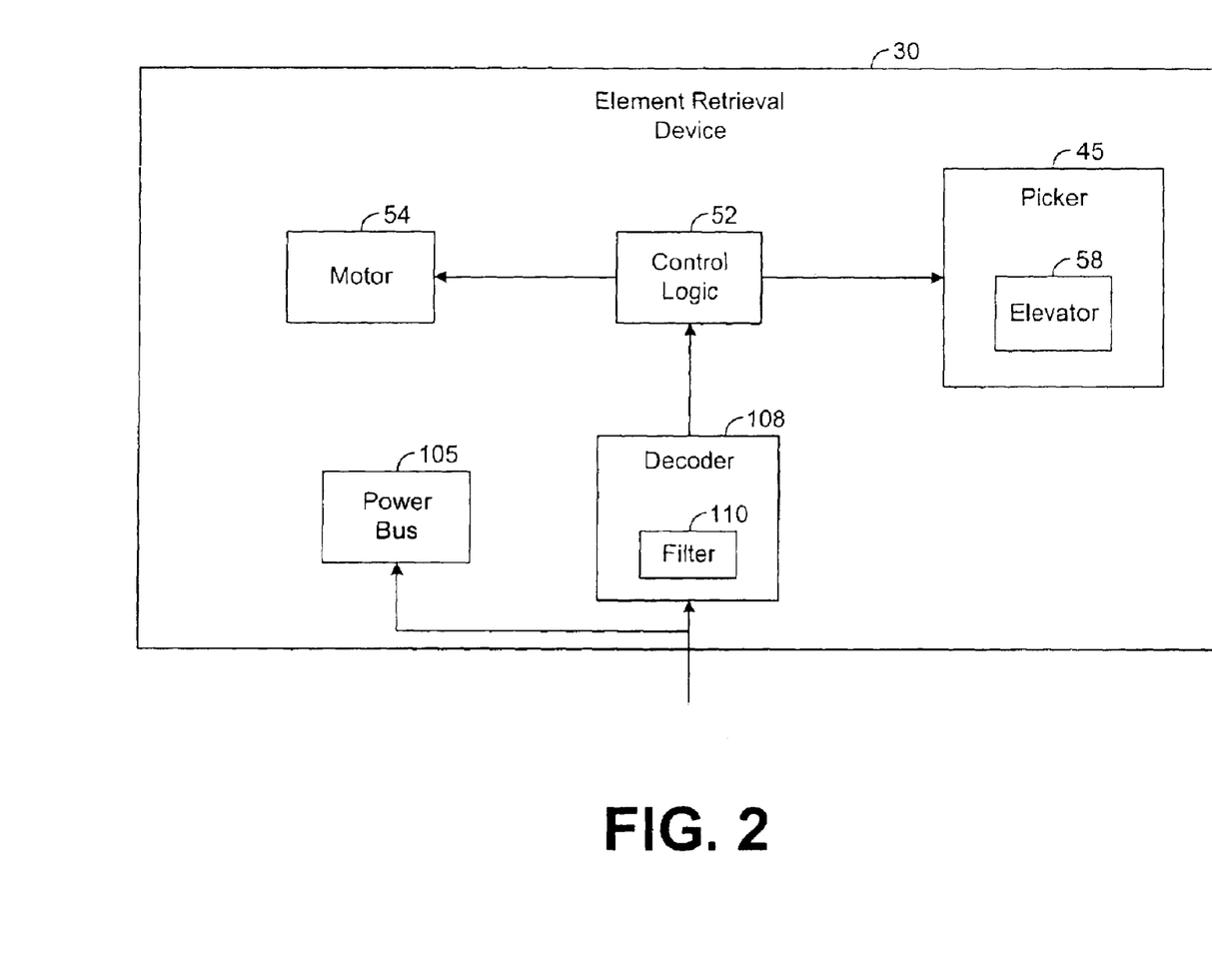
FIG. 2 is a block diagram illustrating an exemplary embodiment of an element retrieval device, such as is depicted in FIG. 1.

As shown by FIG. 2, the element retrieval device 30 comprises control logic 52 for generally controlling the operation of the device 30, and the element retrieval device 30 comprises a motor 54, operating generally under the direction and control of the logic 52, for moving the device 30 in a horizontal direction to and from the element holding apparatus 22 and the element interface device 39. Furthermore, the picker 45 comprises an elevator 58 for moving the picker 45 in a vertical direction that is substantially perpendicular to the horizontal direction of movement enabled by the motor 54. Note that the elevator 58 is optional, and it is not necessary for the picker 45 to employ an elevator 58 in other embodiments.

The control logic 52 can be implemented in software, hardware, or any combination thereof. In an exemplary embodiment depicted by FIG. 3, the control logic 52, along with its associated methodology, is implemented in software and stored in memory 61 of the element retrieval device 30.

Note that the control logic 52, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the control logic 52 may be magnetically stored and transported on a conventional portable computer diskette.

Figure 3:
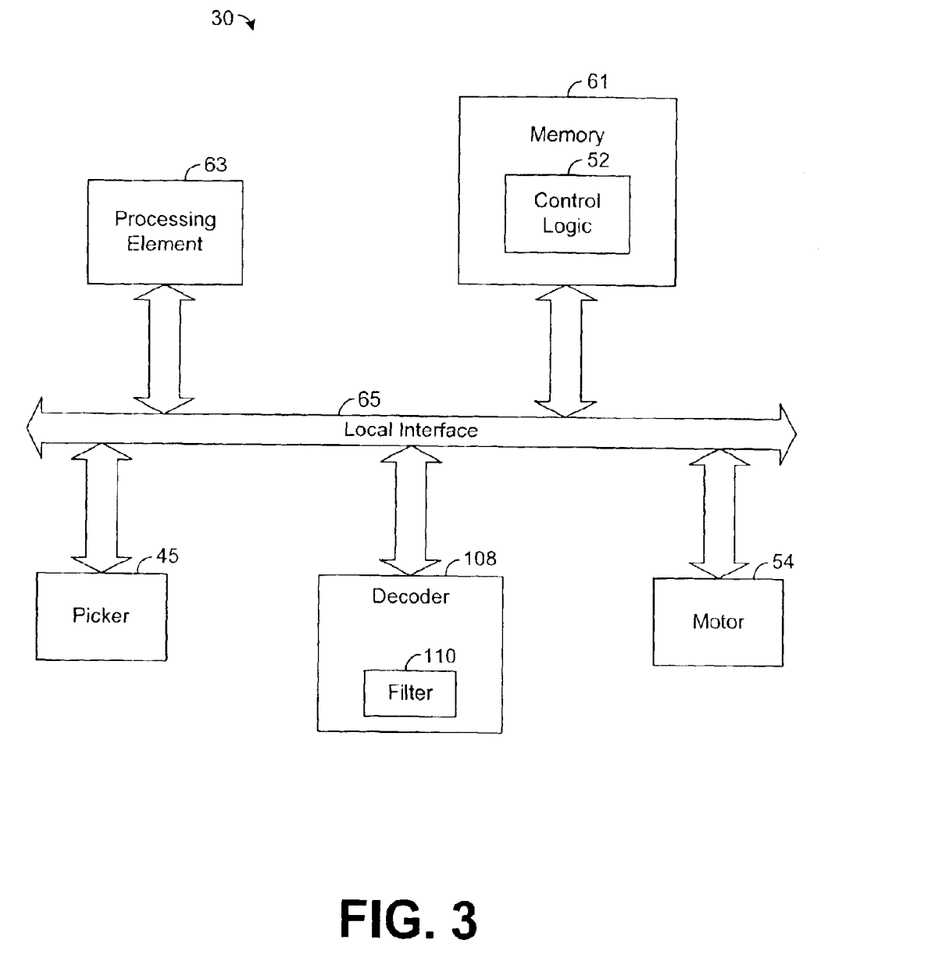
FIG. 3 is a block diagram illustrating an element retrieval device, such as is depicted in FIG. 2.

As depicted by FIG. 3, the element retrieval device 30 comprises at least one conventional processing element 63, such as a digital signal processor (DSP) or a central processing unit (CPU), that communicate to and drive the other elements within the device 30 via a local interface 65, which can include at least one bus. When the control logic 52 is implemented in software, the processing element 63 may be utilized to execute instructions defined by the control logic 52.

Moreover, based on the control data received from the system manager 34 (FIG. 1), the control logic 52 (FIG. 2) preferably controls the motor 54 and the elevator 58 such that the picker 45 is moved to a position adjacent to the identified element 25. The control logic 52 then instructs the picker 45 to retrieve the identified element 25. In response, the picker 45 grasps the identified element 25 and removes the identified element from the element holding apparatus 22. The control logic 52 may then control the motor 54 such that the element 25 is carried to the element interface device 39 by the element retrieval device 30. The control logic 52 may then instruct the picker 45 to load the element 25 into the element interface device 39. In response, the picker 45 preferably inserts the element 25 into the device 39 and then releases the element 25. At this point, the host computer system 37 may utilize the element interface device 39 to access the loaded element 25.

At some point, the host computer system 37 may transmit, to the system manager 34, a command requesting that the previously loaded element 25 be returned to the holding apparatus 22. In response, the system manager 34 preferably transmits, to the element retrieval device 30, control data instructing the device 30 to return the element 25 to the holding apparatus 22. Based on this control data, the control logic 52 of the device 30 controls the motor 54 and the picker 45, including the picker's elevator 58, such that the device 30 retrieves the element 25 from the element interface device 39 and transports the element 25 to the holding apparatus 22. The control logic 52 then controls the picker 45 such that the picker 45 loads the elements 25 into the holding apparatus 22 and then releases the element 25. Note that the element 25 may be returned to the same position in the holding apparatus 22 from where it was originally retrieved, or the element retrieval device 30 may load the element 25 into a different position within the holding apparatus 22.

Figure 4:
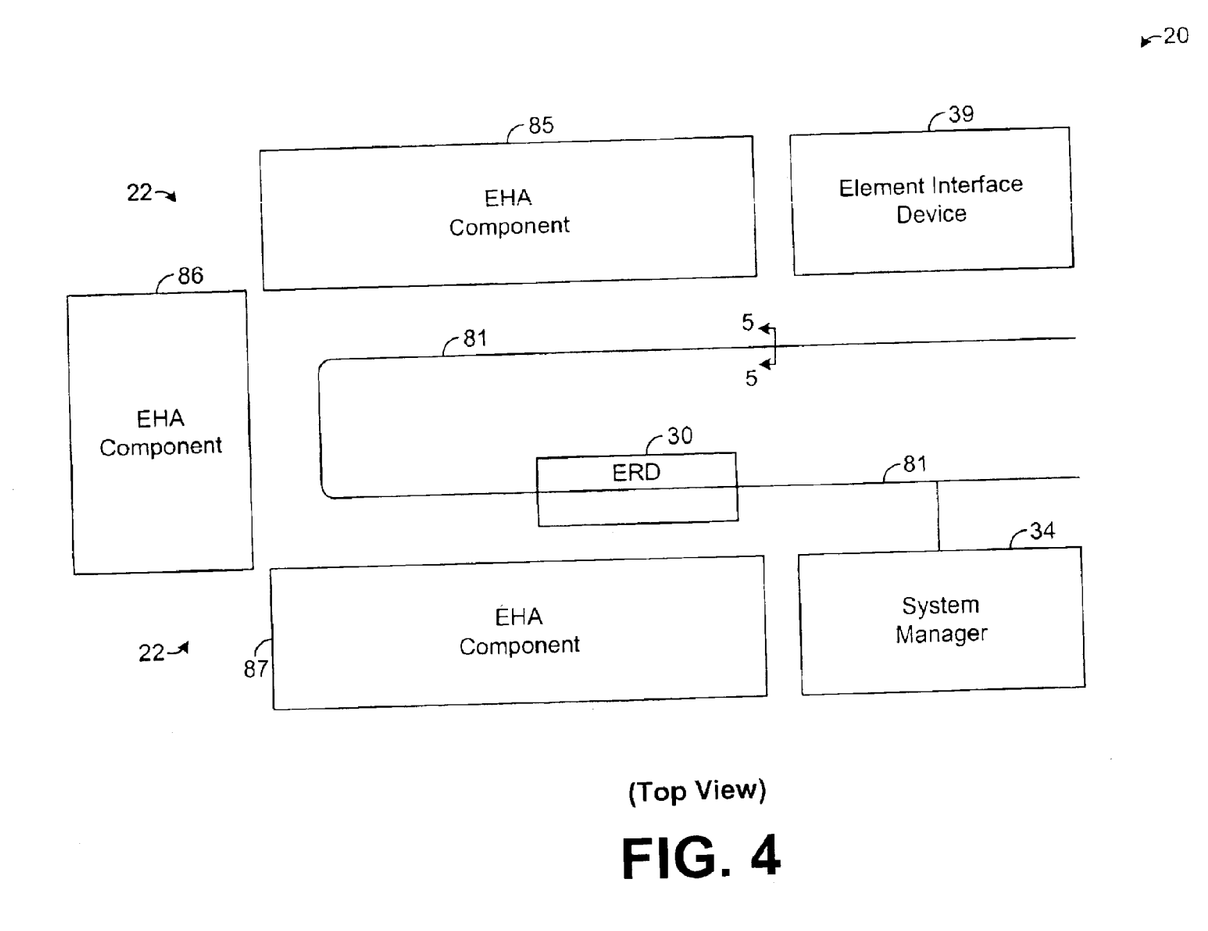
FIG. 4 is a block diagram illustrating a top view of an element handling system, such as is depicted in FIG. 1.
Figure 5:
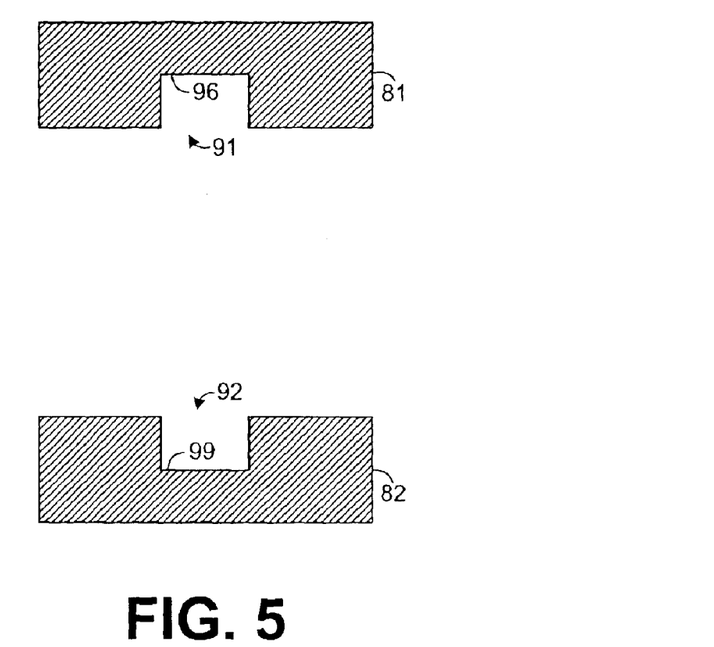
FIG. 5 is a diagram illustrating a cross-sectional view of upper and lower track members depicted in FIG. 4.

The element handling system 20 comprises at least one conductive track member that may be utilized to guide the element retrieval device 30 as it moves through the system 20. As an example, FIGS. 4 and 5 depict an exemplary embodiment where the system 20 comprises U-shaped upper and lower conductive track members 81 and 82 that guide the element retrieval device (ERD) 30 as it moves from the element holding apparatus 22 to the element interface device 39 and vice versa. Note that, in FIG. 4, the element holding apparatus (EHA) 22 comprises multiple components 85–87, each of which preferably stores a plurality of elements 25. Further, note that it is not necessary for the track members 81 and 82 to be U-shaped, and other types of shapes for the track members 81 and 82 are possible in other embodiments.

Figure 6:
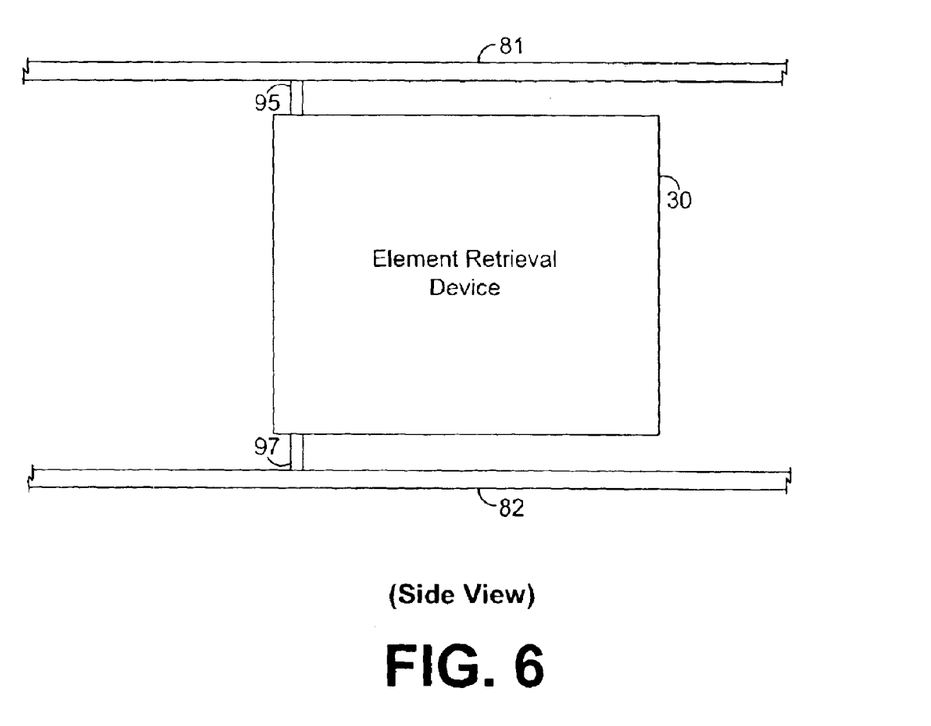
FIG. 6 is a block diagram illustrating a side view of an element retrieval device and, as well as upper and lower track members, such as is depicted in FIG. 4.

As shown by FIG. 5, the upper track member 81 preferably has a groove 91, and the lower track member 82 preferably has a groove 92. As shown by FIG. 6, the element retrieval device 30 comprises a conductive engaging member 95 that extends into the groove 91 of the upper track member 81 and that slides across an inner surface 96 within the groove 91. Note that the element retrieval device 30 may comprise a spring (not shown) for pressing the member 95 against the inner surface 96 such that conductive contact between the conductive track member 81 and the conductive engaging member 95 is substantially maintained as the device 30 moves. Further, the inner track member walls defining the groove 91 preferably act as a guide for guiding the conductive engaging member 95 and, therefore, the element retrieval device 30 along the length of the track member 81 as the device 30 moves.

Similarly, the element retrieval device 30 also comprises a conductive engaging member 97 that extends into the groove 92 of the lower track member 82 and that slides across an inner surface 99 within the groove 92. Note that the element retrieval device 30 may comprise a spring (not shown) for pressing the member 97 against the inner surface 99 such that conductive contact between the track member 82 and the conductive engaging member 97 is substantially maintained as the device 30 moves. Further, the inner track member walls defining the groove 92 preferably act as a guide for guiding the conductive engaging member 97 and, therefore, the element retrieval device 30 along the length of the track member 82 as the device 30 moves.

Note that the upper and lower track member arrangement described above is generally described in more detail in commonly-assigned U.S. patent application Ser. No. 09/641,331 filed on Aug. 18, 2000, which is incorporated herein by reference. However, it should be noted that other configurations of the system 20 and, in particular, the track members 81 and 82 are possible in other embodiments, and the upper and lower track member arrangement described above has been presented herein for illustrative purposes only.

In a preferred embodiment, a combined power and control signal is provided to the element retrieval device 30 over the track members 81 and 82. In this regard, the system manager 34 is preferably coupled to each of the conductive track members 81 and 82 and is preferably configured to transmit a power signal over the conductive track members 81 and 82. In particular, one of the track members 81 or 82 may be driven to a first voltage (e.g., ground) by the manager 34, and the other track member 81 or 82 may be driven to a different voltage by the manager 34. Therefore, the element retrieval device 30, via conductive engaging members 81 and 82, is able to draw power from the voltage difference existing across the conductive track members 81 and 82. In such embodiment, the system manager 34 is configured to maintain approximately a 12 Volt (V) difference between the conductive track members 81 and 82, although other voltage differentials may be maintained in other embodiments.

Furthermore, when the manager 34 is to transmit control data to the element retrieval device 30, the manager 34 preferably encodes a high-frequency signal, such as a radio frequency (RF) signal, for example, with the control data and combines the encoded high-frequency signal with the power signal before transmitting the power signal across the track members 81 and 82. This combined signal is preferably received by the element retrieval device 30 via the conductive engaging members 95 and 97 (FIG. 6), and a power bus 105 (FIG. 2) residing on the element retrieval device 30 distributes power from the combined signal to the other components of the device 30. In addition, a decoder 108 residing on the element retrieval device 30 preferably receives the combined signal, and a filter 110 of the decoder 108 preferably receives and filters the combined signal in order to recover the encoded high-frequency signal. The decoder 108 may then decode the recovered high-frequency signal in order to recover the control data originally encoded on the high-frequency signal by the system manager 34. The control logic 52 then preferably controls the operation of the device 30 based on the control data.

Note that the track members 81 and/or 82 may be a noisy transmission medium for the control data, particularly when the control data is combined with a power signal before being transmitted over the track members 81 and/or 82, as described above. Indeed, the noise present on the track members 81 and/or 82 and the noise induced by the power signal may make recovery of the control data at the element retrieval device 30 problematic in some embodiments.

Moreover, in an effort to enable better recovery of the control data, the high-frequency signal utilized to encode the control data is preferably an RF signal, and the filter 110 utilized in recovering the control data preferably comprises a ceramic filter, which is a high-performance filter often utilized to recover RF transmissions. Indeed, ceramic filters for recovering RF signals at approximately 10.7 Mega-Hertz (MHz) are widely available for use in current RF communication and may be employed in order to recover the encoded high-frequency signal, as described above.

Figure 7:
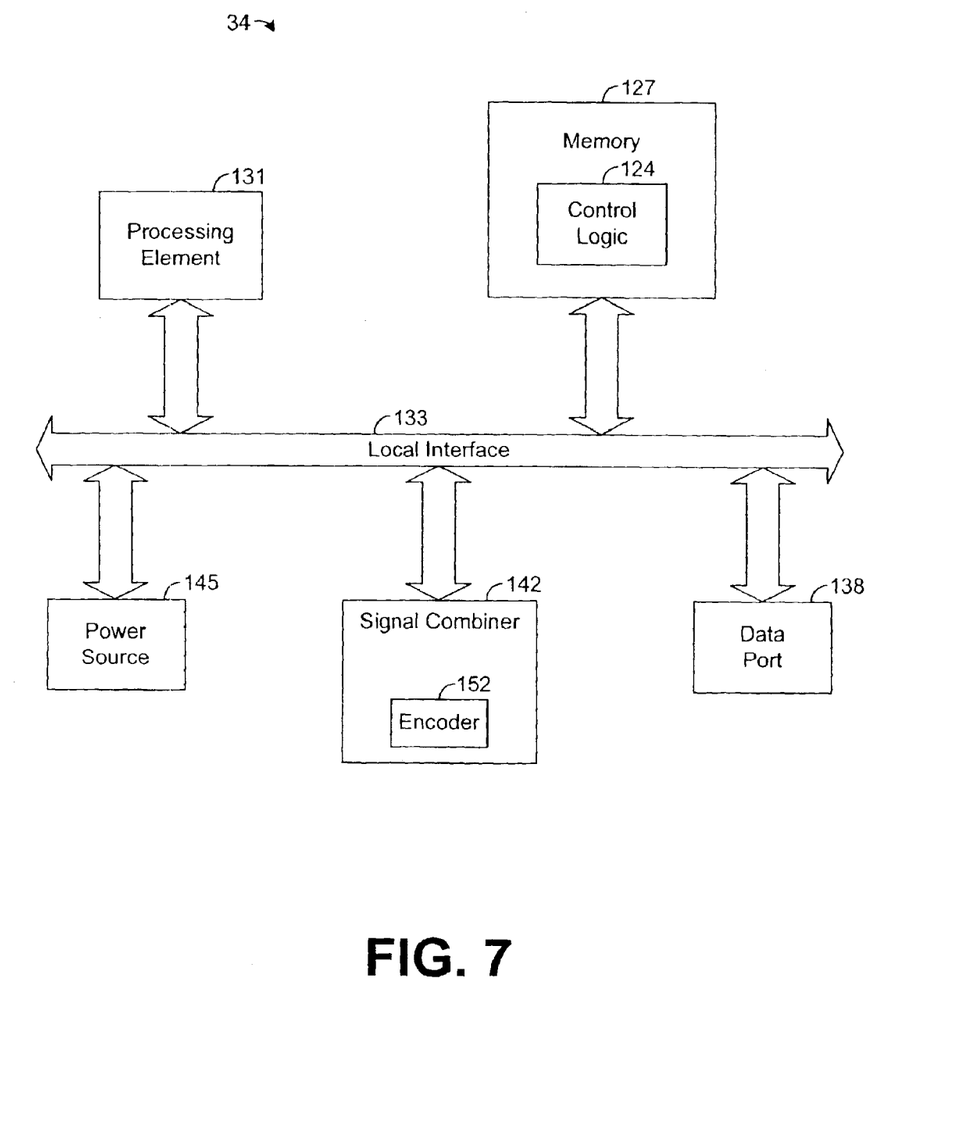
FIG. 7 is a block diagram illustrating a system manager, such as is depicted in FIG. 1.

FIG. 7 depicts an exemplary embodiment of a system manager 34 that is configured to combine an encoded RF frequency signal with a power signal and to transmit the combined RF and power signal over the track members 81 and 82, as described above. As shown by FIG. 7, the system manager 34 preferably comprises control logic 124 that is configured to control the operation of the manager 34. The control logic 124 can be implemented in software, hardware, or any combination thereof. In the exemplary embodiment depicted by FIG. 7, the control logic 124, along with its associated methodology, is implemented in software and stored in memory 127.

The manager 34 may also comprise at least one conventional processing element 131, such as a digital signal processor (DSP) or a central processing unit (CPU), that communicate to and drive the other elements within the manager 34 via a local interface 133, which can include at least one bus. As shown by FIG. 7, the manager 34 may also comprise a data port 138 for communicating with the host computer system 37 (FIG. 1).

A signal combiner 142 is preferably employed to combine encoded control data with a power signal. In this regard, the control logic 124 may generate or otherwise provide control data that is to be communicated to the element retrieval device 30 (FIG. 1). The signal combiner 142 preferably receives this control data, and an encoder 152 of the signal combiner 142 may encode this data onto an RF signal preferably transmitting at approximately 10.7 MHz. The signal combiner 142 may then combine the encoded RF signal with a power signal received from a power source 145, such as a battery or generator, for example. In the preferred embodiment, the signal combiner 142 combines the RF and power signals by transmitting over at least one of the track members 81 or 82 the power signal along with the RF signal that is encoded with the control data.

Figure 8:
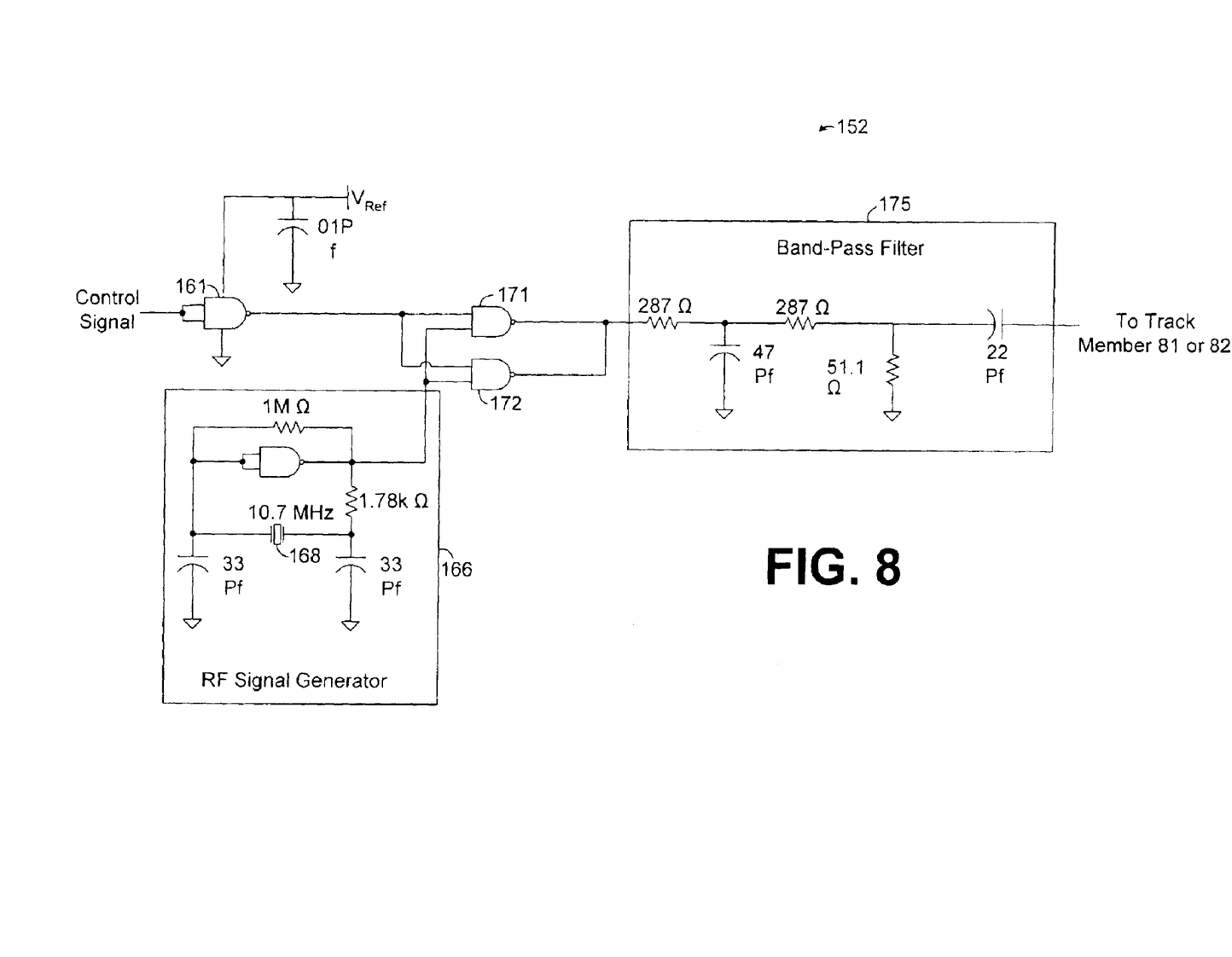
FIG. 8 is a circuit diagram illustrating an encoder, such as is depicted in FIG. 7.

FIG. 8 depicts an exemplary embodiment of an encoder 152 that may be employed by the signal combiner 142 to encode an RF signal with control data in accordance with the preferred embodiment. As shown by FIG. 8, a NAND gate 161 receives a control signal comprising control data from the control logic 124 (FIG. 7) and biases the control signal with respect to a reference voltage ($V_{ref}$), such as 5 Volts, for example. Furthermore, an RF signal generator 166 having a crystal 168 generates an RF signal. In the preferred embodiment, the crystal 168 generates an RF signal at approximately 10.7 MHz, although other frequencies are possible in other embodiments. The RF signal generated by the signal generator 166 is then encoded with the control data of the biased control signal by NAND gates 171 and 172. This encoded signal, referred to hereafter as the "encoded control signal," is then transmitted across one of the track members 81 or 82 along with the power signal received from the power source 145 (FIG. 7).

Note that, to help reduce noise and improve signal quality, the encoded signal is preferably passed through a band-pass filter 175 before being transmitted across one of the track members 81 or 82. The band-pass filter 175 preferably filters out signals having frequencies different than the frequency of the signal generated by the signal generator 166. Thus, the encoded control signal is allowed to pass, and noise outside of the frequency band of the signal generator 166 is filtered. In addition, it should be noted that the resistance and capacitance values depicted in FIG. 8 are sufficient for enabling an encoded control signal of 10.7 MHz to be generated and filtered. However, in other embodiments, other resistance and capacitance values are possible in order to generate an encoded control signal of 10.7 MHz or some other frequency.

Figure 9:
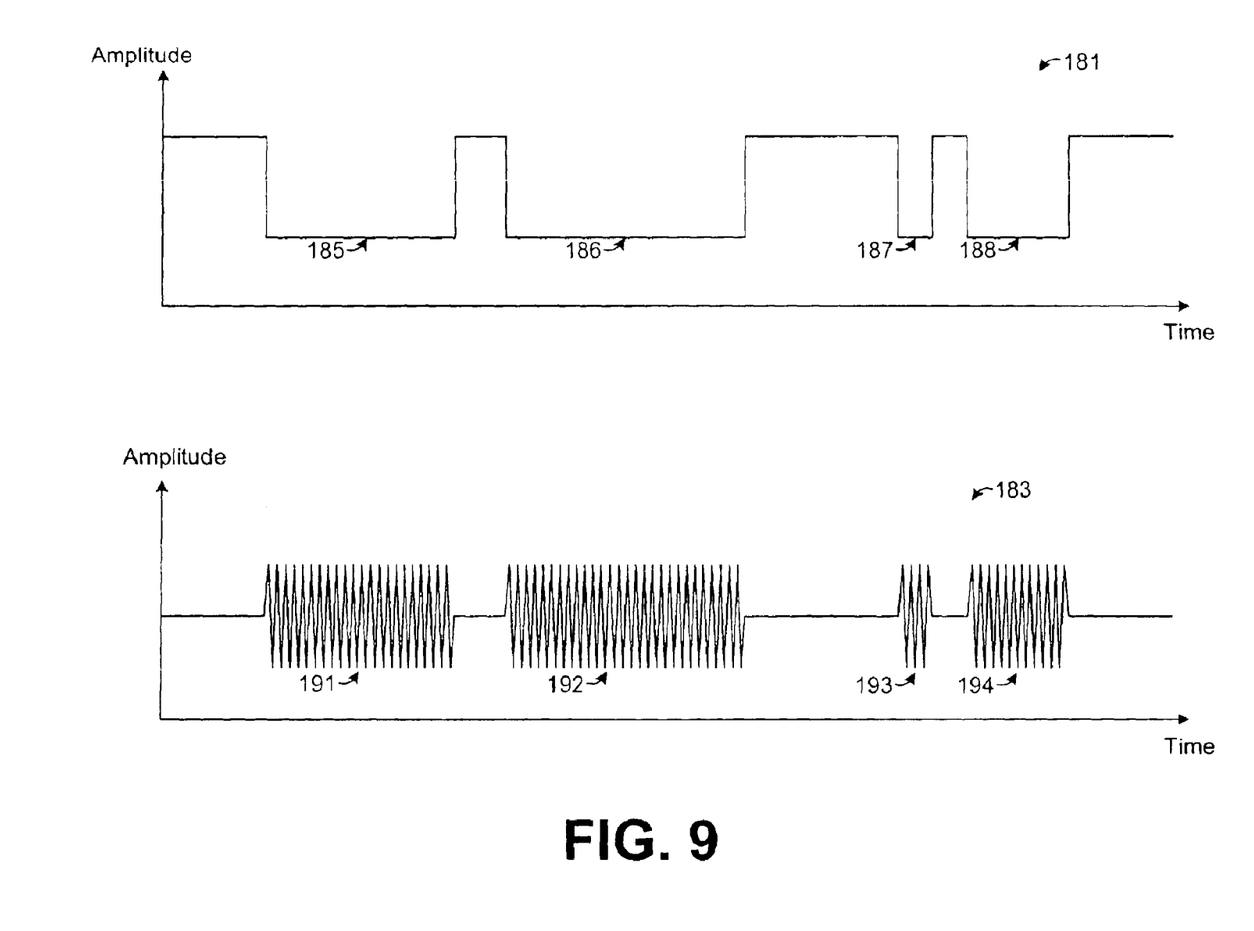
FIG. 9 is a diagram illustrating an exemplary control signal that may be input into the encoder of FIG. 8 and a corresponding output of the encoder.

Moreover, by passing a control signal through the encoder 152 depicted by FIG. 8, logical low portions of the control signal are converted into high frequency bursts. In this regard, refer to FIG. 9, which depicts an exemplary digital control signal 181 before being passed through the encoder 152 and the corresponding output signal 183 of the encoder 152 that is produced by encoding the control signal 183 onto an RF signal. As shown by FIG. 9, each of the logical low portions 185–188 of the control signal 181 are converted, by the encoder 152, into high frequency bursts 191–194, respectively.

Once the combined RF and power signal, referred to hereafter as "the combined signal," is received by the decoder 108 (FIG. 2) of the element retrieval device 30, the decoder's filter 110 preferably filters the combined signal to recover the RF signal that is encoded with the control data. In the preferred embodiment where the signal generator 166 (FIG. 8) of the system manager 34 generates an RF signal of 10.7 MHz, the filter 110 of the element retrieval device 30 is tuned to 10.7 MHz such that frequencies other than approximately 10.7 MHz are filtered out. The decoder 108 then decodes the filtered signal in order to recover the original control data of the control signal received by the signal combiner 142 (FIG. 7). It should be noted that frequencies other than 10.7 MHz may be employed to transmit the control data. In such embodiments, the filter 110 is preferably tuned to the frequency of the control signal generated by the system manager 34 such that the control data is recovered by the decoder 108.

Figure 10:
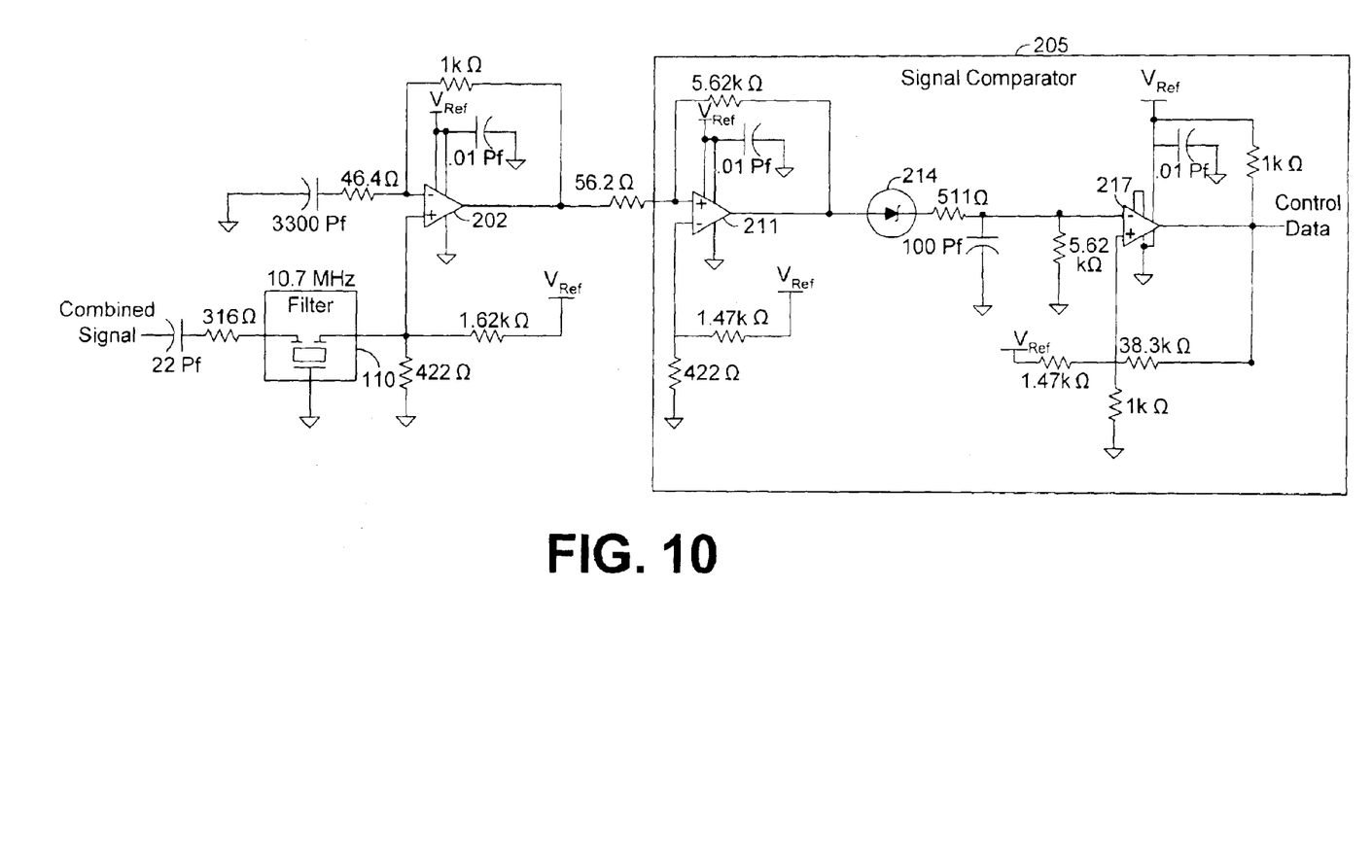
FIG. 10 is a circuit diagram illustrating a decoder, such as is depicted in FIG. 2.

FIG. 10 depicts an exemplary embodiment of a decoder 108 that may be utilized to filter and decode the combined signal received from track member 81 or 82. As shown by FIG. 10, a filter 110, which is preferably a ceramic filter tuned to 10.7 MHz, receives and filters the combined signal in order to recover the encoded RF signal originally output by the encoder 152 of the system manager 34. This filtered RF signal is then biased by amplifier 202 with respect to $V_{ref}$.

The biased signal is then passed through a signal comparator 205 that recovers the control data originally utilized to encode the RF signal generated by the encoder 152. In this regard, the filtered RF signal is amplified by an amplifier 211 and then peak detected via diode 214. The signal output by the diode 214 is then compared to $V_{ref}$ by amplifier 217 and amplified. Moreover, the signal output by the amplifier 217 preferably represents the control signal originally received by the encoder 152 of the system manager 34.

The control signal decoded by the decoder 108 is preferably transmitted to the control logic 52, which preferably utilizes the control data defined by this signal to control the operation of the element retrieval device 30. As an example, the data defined by the decoded control signal may indicate that a particular element 25 is to be retrieved and moved to another location within the element handling system 20. In response to such data, the control logic 52 may control the motor 54 and the picker 45 such that the requested operation is performed by the element retrieval device 30.

It should be noted that encoding and/or decoding of control data may occur at any time relative to the motion or action of the element retrieval device 30. For example, it is possible for a new command to be transmitted to and decoded by the element retrieval device 30 before, during, or after execution of a previous command by the element retrieval device 30. Indeed, it is possible for the new command to be encoded and transmitted by the system manager 34 and/or to be received and decoded by the element retrieval device 30 while the element retrieval device 30 is moving along the track members 91 and 92 and/or while the picker 45 is otherwise handling an element 25.

Figure 11:
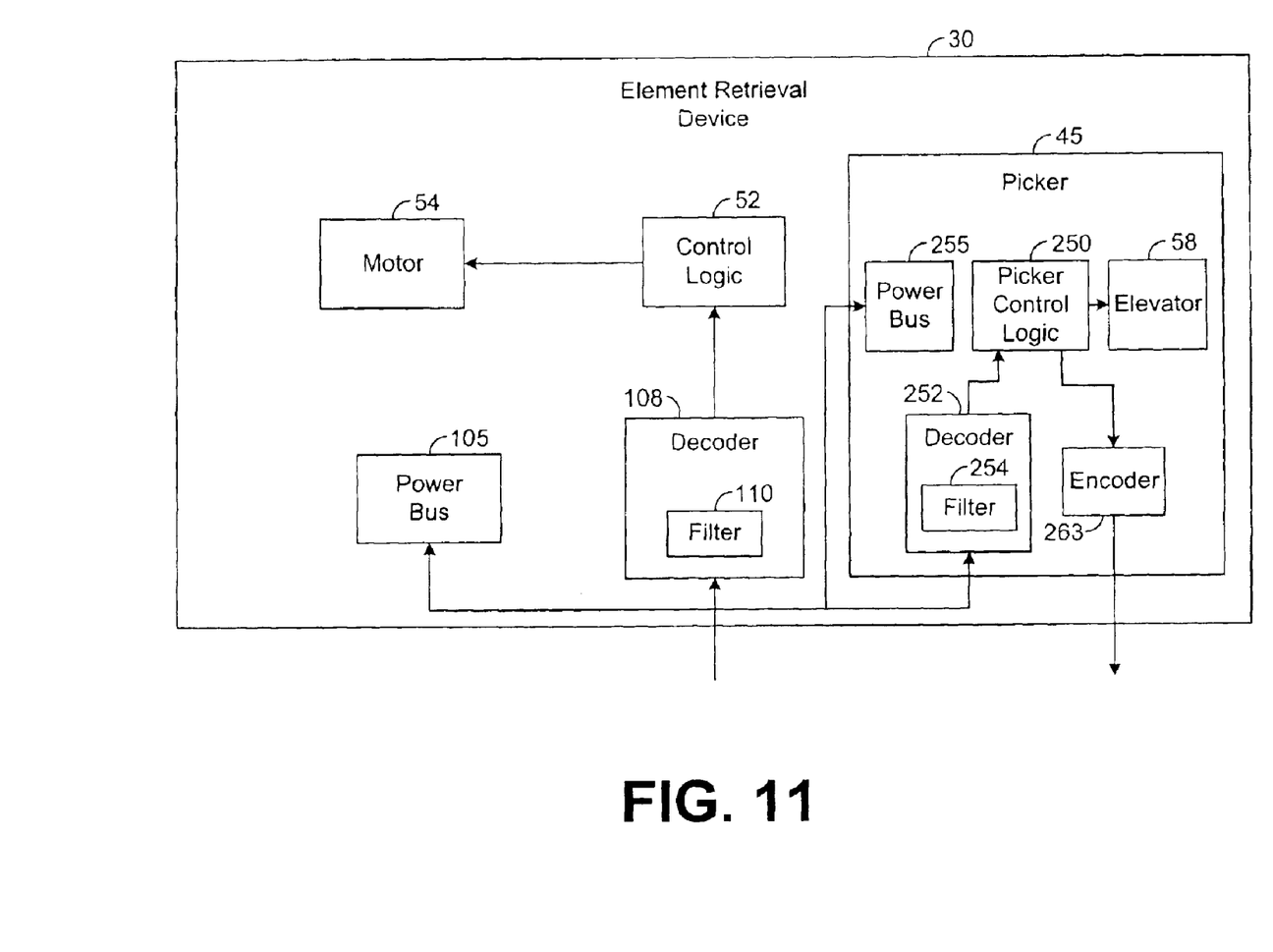
FIG. 11 is a block diagram illustrating another exemplary embodiment of a element retrieval device, such as is depicted in FIG. 1.

Furthermore, it is not necessary for the control logic 52 depicted in FIG. 2 to control both the motor 54 for moving the element retrieval device 30 in a horizontal direction and the elevator 58 for moving the picker 45 in a vertical direction. In this regard, as shown by FIG. 11, picker control logic 250 for controlling the operation of the picker 45 based on control data from the system manager 34 may be implemented separate from the control logic 52 and may reside on or near the picker 45. In the embodiment depicted by FIG. 11, the picker control logic 250 is implemented in hardware in an effort to simplify the picker's circuitry. However, in other embodiments, the picker control logic 250 may be implemented in software or a combination of software and hardware.

As shown by FIG. 11, the picker 45 may comprise a decoder 252 and filter 254 for recovering control signals transmitted from the system manager 34 according to the same techniques employed by decoder 108 and filter 110 described hereinabove. Further, the picker 45 may also comprise a picker power bus 255 for receiving the power signal transmitted over track members 81 and 82 and for providing power from this signal to the other components of the picker 45.

Note that the picker 45 preferably moves with respect to other components (e.g., decoder 108, motor 54, etc.) of the element retrieval device 30. Thus, providing both power and control data to the picker 45 via a combined signal eliminates the need of coupling one or more wires between the picker 45 and the other components of the device 34, thereby reducing the risk that the picker 45 will become entangled and malfunction. Further, eliminating the utilization of wires between the picker 45 and the other components of the device 34 eliminates errors that may occur due to fatigue and/or failure of such wires.

Moreover, the encoded control data transmitted over the track members 81 and/or 82 may comprise data destined for control logic 52 and data destined for picker control logic 250. In order to enable the control logic 52 and the picker control logic 250 to determine the destination of the control data, the system manager 34 may be configured to insert headers or other types of tags into the control data being transmitted to the element retrieval device 30. More specifically, each byte of control data transmitted by the signal combiner 152 may be associated with a header indicating whether the byte of data is destined for the control logic 52 or is destined for the picker control logic 250. In this regard, control data to be utilized by the control logic 52 for controlling the non-picker operations of the device 30 (e.g., for controlling the motor 54) is preferably associated with a header identifying the control logic 52, and control data to be utilized by the picker control logic 45 for controlling the operation of the picker 45 (e.g., for moving the elevator 58 in order to raise or lower the picker 45 or for instructing the picker 45 to grasp or release a element 25) is preferably associated with a header identifying the picker control logic 250.

Thus, the control logic 52, upon receiving a byte of control data from decoder 108, preferably analyzes the associated header in order to determine whether or not the byte is destined for the control logic 52. If the byte of data is destined for the control logic 52, then the control logic 52 reads the byte of data and controls operation of the device 30 based on the byte of data. However, if the byte of data is not destined for the control logic 52, then the control logic 52 may ignore the byte of data.

Similarly, the picker control logic 250, upon receiving a byte of control data from decoder 252, preferably analyzes the associated header in order to determine whether or not the byte is destined for the picker control logic 250. If the byte of data is destined for the picker control logic 250, then the picker control logic 250 reads the byte of data and controls operation of the picker 45 based on the byte of data. However, if the byte of data is not destined for the picker control logic 250, then the picker control logic 250 may ignore the byte of data.

It should be noted that the elevator 58 may be controlled via pulse width modulation (PWM), if desired. Further, the system manager 34 may be configured to control the elevator 58 by transmitting the proper PWM values for causing the elevator 58 to perform a desired task. Moreover, upon receiving such PWM values destined for the picker control logic 250, the picker control logic 250 may be configured to simply pass the PWM values to the elevator 58. Thus, it is not necessary for the picker control logic 250 to actually determine the PWM values to be provided to the elevator 58, thereby helping to simplify and minimize the amount of circuitry necessary for implementing the picker control logic 250. Note that it is possible in other embodiments for either the control logic 52 or the picker control logic 250 to determine the PWM values to be provided to the elevator 58 based on instructions from the system manager 34. Further, if motor 54 (FIG. 2) is controlled via pulse width modulation, PWM values may be similarly transmitted to the motor 54 via the system manager 34 and/or the control logic 52.

It should be further noted that, as shown by FIG. 11, the element retrieval device 30 may comprise an encoder 263 that may be utilized by the picker control logic 250 to transmit signals to the system manager 34. As an example, the picker control logic 250 may transmit an acknowledgement of any request successfully received by the logic 250. In addition, after successfully performing a requested task, the picker control logic 250 may transmit, to the manager 34, data indicative of the completed task. Further, in the embodiments described above where the manager 34 transmits PWM values for the elevator 58 to the element retrieval device 30, the logic 250 may be configured to transmit successfully received PWM values back to the manager 34 such that the manager 34 can verify that the correct PWM values have been provided to the elevator 58.

The configuration and operation of the encoder 263 may be similar to that of the encoder 152 (FIG. 2) of the system manager 34 previously described hereinabove. Further, the system manager 34 may comprise a decoder (not specifically shown) for receiving and recovering the data transmitted to it from the element retrieval device 30. In order to avoid potential interference between the signals transmitted over the track members 81 and/or 82, the encoded signals transmitted by the system manager 34 may be at a frequency different than the frequency of the encoded signals transmitted by the element retrieval device 30. Alternatively, the data transmitted by the system manager 34 may be passed over one of the track members 81 or 82, and the data transmitted by the element retrieval device 30 may be passed over the other of the track members 81 or 82. In addition, the element retrieval device 30 may comprise an encoder (not shown), similar to the picker encoder 263 of FIG. 11, to enable the control logic 52 to transmit messages (e.g., acknowledgements) to the system manager 34.

A preferred use and operation of the element handing system 20 and associated methodology are described hereafter.

Figure 12:
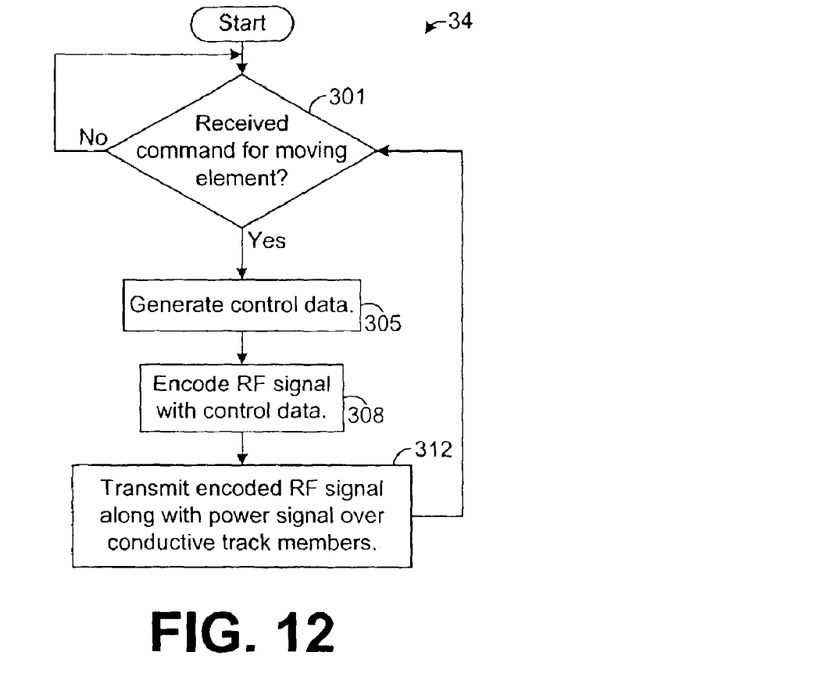
FIG. 12 is a flow chart illustrating an exemplary architecture and functionality of a system manager, such as is depicted in FIG. 1.

Assume, for illustrative purposes, that the system manager 34 receives, from the host computer system 37 (FIG. 1), a command for moving an element 25 from one location (e.g., holding apparatus 22) within the element handling system 20 to another location (e.g., element interface device 39) within the element handling system 20. In such an example, the system manager 34 generates control data for instructing the element retrieval device 30 to perform the commanded task, as shown by blocks 301 and 305 of FIG. 12. If the control logic 52 and picker control logic 250 are implemented separately, as shown by FIG. 11, then the system manager 34 may associate each byte of control data for controlling the picker 45 with a first type of header, referred to hereafter as a "picker header," and the system manager 34 may associate each byte of control data for controlling the other components of the device 30 with a second type of header, referred to hereafter as a "non-picker header."

After generating the control data in block 305, the system manager 34 then encodes an RF signal with the control data, as shown by block 308. This encoded RF signal is then transmitted over at least one of the track members 81 and/or 82 along with a power signal from the power source 145 (FIG. 7), as shown by block 312 of FIG. 12, thereby communicating a combined power and control signal over the track members 81 and/or 82. Note that the power signal is preferably continuously transmitted over the track members 81 and 82 regardless of whether there is any control data that is to be transmitted to the element retrieval device 30. Therefore, the device 30 is continuously provided with power even during periods when no control data is transmitted to the element retrieval device 30.

Figure 13:
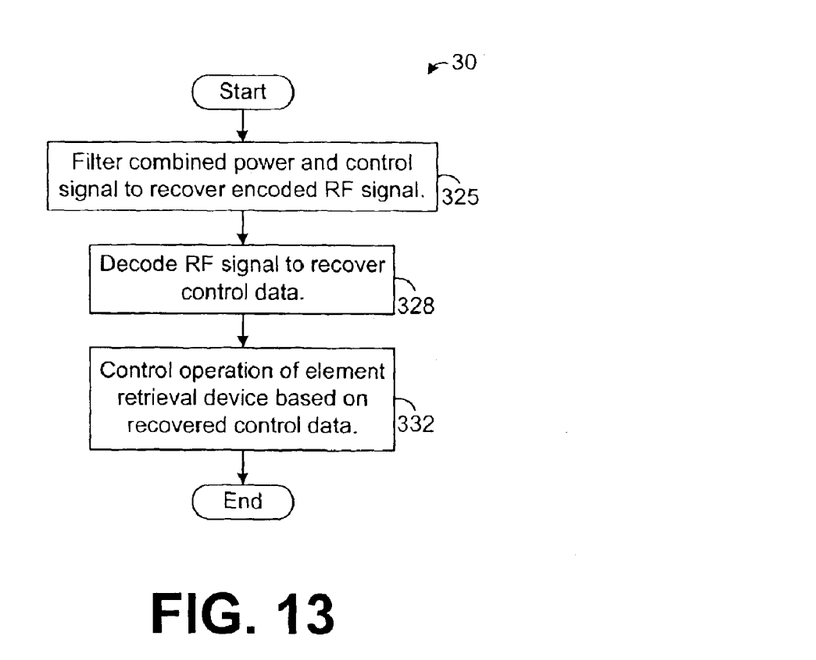
FIG. 13 is a flow chart illustrating an exemplary architecture and functionality of an element retrieval device, such as is depicted in FIG. 1

Upon receiving the combined power and control signal, the element retrieval device 30 filters the combined power and control signal to recover the aforedescribed encoded RF signal, as shown by block 325 of FIG. 13. Preferably, a ceramic filter 110 is employed to recover the encoded RF signal. The decoder 108 of the element retrieval device 30 then decodes, in block 328, the recovered RF signal in order to recover the control data previously generated by the system manager 34 in block 305 of FIG. 12. Also, if the control logic 52 and picker control logic 250 are implemented separately as shown in FIG. 11, then a ceramic filter 254 recovers the encoded RF signal, and the decoder 252 recovers the control data previously generated by the system manager 34 in block 305 of FIG. 12. The control logic 52 and/or the picker control logic 250 preferably utilize the recovered control data in order to cause the element retrieval device 30 to perform the instructed task, as depicted by block 332.

In particular, the control logic 52 may ignore each byte of the control data associated with a picker header and may utilize the remainder of the control data to control the operation of the element retrieval device 30 (e.g., to control operation of the motor 54). Further, the picker control logic 250 may ignore each byte of the control data associated with a non-picker header and may utilize the remainder of the control data to control the operation of the picker 45.

Moreover, by performing the aforedescribed techniques, the element retrieval device 30 may be efficiently and reliably provided with both power and control data via the conductive track members 81 and 82.

It should be noted that the steps described above as being implemented by the element retrieval device 30 and the system manager 34 may occur in various orders, and it is possible for some of the steps to be omitted without departing from the principles of the present invention, as is defined by the claims.

Now, therefore, the following is claimed:

1. An element handling system, comprising:
    an element holding apparatus having a plurality of movable elements stored therein;
    a system manager configured to encode a signal with control data and to combine the encoded signal with a power signal thereby forming a combined power and control signal, the system manager further configured to transmit the combined power and control signal;
    an element retrieval device configured to retrieve and transport at least one of the movable elements based on the control data, wherein the element retrieval device comprises a picker configured to remove at least one movable element from the element holding apparatus based on a portion of the control data;
    a first decoder coupled to the element retrieval device, the first decoder configured to filter the combined vower and control signal thereby recovering the encoded signal, the first decoder further configured to decode the recovered signal thereby recovering the control data; and
    a second decoder coupled to the picker, the second decoder configured to receive the combined power and control signal and to filter the combined power and control signal thereby recovering the encoded signal, the second decoder configured to decode the recovered signal thereby recovering the control data.

2. The system of claim 1, wherein the element retrieval device is configured to travel along at least one conductive track member, and wherein the system manager is configured to transmit the combined power and control signal to the first and second decoders over the at least one conductive track member.

3. The system claim 1, wherein the second decoder comprises a ceramic filter.

4. The system of claim 1, wherein at least one byte of the control data is associated with a tag indicating whether the at least one byte is for controlling the picker.

5. The system of claim 4, wherein the picker comprises picker control logic configured to make a determination, based on the tag, as to whether the at least one byte is for controlling the picker and to utilize the at least one byte to control the picker based on the determination.

6. The system of claim 1, wherein at least one byte of control data comprises a pulse width modulation (PWM) value.

7. An element handling system, comprising:
    an element holding apparatus having a plurality of movable elements stored therein;
    a system manager configured to encode a first signal with control data and to combine the encoded first signal with a power signal thereby forming a combined power and control signal, the system manager further configured to transmit the combined power and control signal;
    an element retrieval device configured to retrieve and transport at least one of the movable elements based on the control data; and a decoder coupled to the element retrieval device, the decoder configured to filter the combined power and control signal thereby recovering the encode first signal, the decoder further configured to decode the recovered signal thereby recovering the control data, wherein the element retrieval device comprises a picker and picker control logic, wherein at least one byte of control data comprises a pulse width modulation (PWM) value, and wherein the picker control logic is further configured to cause an encoder to encode a second signal with the PWM value and to transmit the second encoded signal to the system manager.

8. The system of claim 7, wherein the encoder transmits the second encoded signal over a conductive track member.

9. An element handling system, comprising:

an element retrieval device configured to retrieve and transport a movable element in response to control data, wherein the element retrieval device comprises a picker configured to retrieve the element based on a portion of the control data;

a first decoder coupled to the element retrieval device, the first decoder configured to filter a combined power and control signal to recover an encoded control signal, the first decoder further configured to decode the encoded control signal to recover the control data; and a second decoder coupled to the picker, the second decoder configured to filter the combined power and control signal to recover the encoded control signal, the second decoder further configured to decode the encoded control signal to recover the control data.

10. The system of claim 9, wherein the first decoder comprises a ceramic filter tuned to a frequency of the encoded control signal.

11. The system of claim 9, further comprising a signal combiner configured to encode a signal with the control data thereby forming the encoded control signal and to combine the encoded control signal with a power signal thereby forming the combined power and control signal.

12. The system of claim 9, wherein at least one byte of the control data is associated with a tag indicating whether the at least one byte is for controlling the picker.

13. The system of claim 12, wherein the picker comprises picker control logic configured to make a determination, based on the tag, as to whether the at least one byte is for controlling the picker and to utilize the at least one byte to control the picker based on the determination.

14. The system of claim 9, wherein the element retrieval device has a conductive member that slides along a surface of at least one conductive track member as the element retrieval device moves.

15. The system of claim 14, wherein the first and second decoders are configured to receive the combined power and control signal from the conductive track member of the element retrieval device.

16. An element handling system, comprising:

an element retrieval device configured to retrieve and transport a movable element in response to control data;

a ceramic filter coupled to the element retrieval device, the ceramic filter configured to filter a combined power and control signal thereby recovering the control signal, the control signal comprising the control data, wherein the element retrieval device comprises a picker configured to retrieve the element based on a portion of the control data; and a second ceramic filter coupled to the picker, the second ceramic filter configured to filter the power signal from the control signal thereby recovering the control signal.

17. An element handling system, comprising:

an element retrieval device configured to transport, based on a first portion of control data, a movable element, the element retrieval device comprising a picker configured to remove the movable element from an element holding apparatus based on a second portion of the control data;

a first decoder coupled to the element retrieval apparatus and configured to receive and filter a combined power and control signal to provide a first control signal, the first decoder further configured to decode the first control signal thereby recovering the first portion of the control data; and a second decoder coupled to the picker and configured to receive and filter the combined power and control signal to provide a second control signal, the second decoder configured to decode the second control signal thereby recovering the second portion of the control data.

18. The system of claim 17, further comprising a system manager configured to encode a radio frequency (RF) signal with the control data and to combine the encoded RF signal with a power signal thereby forming the combined power and control signal.

19. The system of claim 18, wherein the first decoder comprises a first ceramic filter and the second decoder comprises a second ceramic filter.

20. The system of claim 1, wherein the power signal is provided by a direct current (DC) power source.

21. The system of claim 1, wherein the signal encoded with the control data is a radio frequency (RE) signal.

22. The system of claim 1, wherein the first decoder comprises a ceramic filter.

23. The system of claim 7, wherein the first signal is a radio frequency (RF) signal, and wherein the second signal is a RF signal.

24. The system of claim 7, wherein the decoder comprises a ceramic filter.

25. The method of claim 11, wherein the encoded control signal is a radio frequency (RF) signal.

* * * * *

UNITED STATES PATENT AND TRADEMARK OFFICE
CERTIFICATE OF CORRECTION

| | | |
|---|---|---|
| PATENT NO. | : 6,957,124 B2 | Page 1 of 1 |
| APPLICATION NO. | : 10/421520 | |
| DATED | : October 18, 2005 | |
| INVENTOR(S) | : Thomas W. Holmquist et al. | |

It is certified that error appears in the above-identified patent and that said Letters Patent is hereby corrected as shown below:

In column 12, line 26, in Claim 1, delete "vower" and insert -- power --, therefor.

In column 12, line 43, in Claim 3, after "system" insert -- of --.

In column 13, line 3, in Claim 7, delete "encode" and insert -- encoded --, therefor.

In column 14, line 45, in Claim 21, delete "(RE)" and insert -- (RF) --, therefor.

In column 14, line 53, in Claim 25, delete "claim 11" and insert -- claim 9 --, therefor.

Signed and Sealed this

Fourteenth Day of September, 2010

David J. Kappos
*Director of the United States Patent and Trademark Office*